US007096491B2

(12) United States Patent
Cheng

(10) Patent No.: US 7,096,491 B2
(45) Date of Patent: Aug. 22, 2006

(54) MOBILE CODE SECURITY ARCHITECTURE IN AN APPLICATION SERVICE PROVIDER ENVIRONMENT

(75) Inventor: Lebin Cheng, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 809 days.

(21) Appl. No.: 09/908,592

(22) Filed: Jul. 20, 2001

(65) Prior Publication Data
US 2003/0033539 A1    Feb. 13, 2003

(51) Int. Cl.
    G06F 7/04      (2006.01)
    G06F 7/58      (2006.01)
    G06F 15/16     (2006.01)
    G06F 17/30     (2006.01)
    G06K 9/00      (2006.01)

(52) U.S. Cl. .................. 726/4; 726/4; 726/6; 726/21; 726/27; 705/52; 705/65; 705/67; 705/76; 705/78; 705/80; 717/134

(58) Field of Classification Search ............... 726/4, 726/6, 21, 27–30; 705/52, 65, 67, 76, 78, 705/80, 26, 39, 50; 717/134; 709/203, 217, 709/200–206, 315; 379/202; 713/200–202; 395/186–188
See application file for complete search history.

(56) References Cited

U.S. PATENT DOCUMENTS

| 5,974,549 | A  | * | 10/1999 | Golan ........................ 713/200 |
| 6,317,742 | B1 | * | 11/2001 | Nagaratnam et al. ........... 707/9 |
| 6,480,962 | B1 | * | 11/2002 | Touboul ..................... 713/200 |
| 6,526,513 | B1 | * | 2/2003  | Shrader et al. ............. 713/200 |
| 6,691,230 | B1 | * | 2/2004  | Bardon ....................... 713/200 |
| 6,816,882 | B1 | * | 11/2004 | Conner et al. ............... 709/203 |
| 2002/0013910 | A1 | * | 1/2002  | Edery et al. ................. 713/201 |
| 2002/0071540 | A1 | * | 6/2002  | Dworkin ................... 379/202.01 |
| 2002/0082988 | A1 | * | 6/2002  | Ujiie et al. .................. 705/39 |
| 2002/0087717 | A1 | * | 7/2002  | Artzi et al. .................. 709/236 |
| 2002/0198840 | A1 | * | 12/2002 | Banka et al. .................. 705/50 |
| 2004/0015886 | A1 | * | 1/2004  | Aaltonen et al. ............ 717/134 |

OTHER PUBLICATIONS

Li Gong, et al., "Implementing Protection Domains in the Java Development Kit 1.2", Mar. 1998, In Proceedings of the Internet Society Symp. on Network and Distributed System Security, San Diego, CA, pp. 1-10.

Li Gong, et al., "Going Beyond the Sandbox: An Overview of the New Security Architecture in the Java Development Kit 1.2", Dec. 1997, In Proceedings of the USENIX Symposium on Internet Technologies and Systems, Monterey, CA., pp. 1-10.

(Continued)

*Primary Examiner*—Ayaz Sheikh
*Assistant Examiner*—Shin-Hon Chen

(57) ABSTRACT

A method is disclosed for providing mobile code software applications to users via an application service provider (ASP). The ASP receives a mobile code application, such as a Java application, from a provider, along with a security specification. The security specification defines access privileges requested to execute the application, including privileges to execute functions performed by the application and privileges to access local resources of the ASP. The ASP receives a subscription to the application from a user. The subscription includes subscription information granting or denying privileges, and specifying parameters for the privileges, requested in the security specification. The ASP executes the application at runtime by determining for each executable function whether the user has authorized the requested privilege. Those functions authorized by the user are executed in one embodiment. During runtime the ASP limits the application's access to local resources based on the privileges granted by the user.

17 Claims, 5 Drawing Sheets

OTHER PUBLICATIONS

Trent Jaeger, et al., "Building Systems That Flexibly Control Downloaded Excutable Content", Proocedings of the Sixth USENIX UNIX Security Symposium, San Jose, CA, Jul. 1996, pp. 1-19.

Li Gong, "Secure Java Class Loading", Mobile code security, Nov./Dec. 1998, IEEE Internet Computing, pp. 56-61.

Aviel D. Rubin, et al., "Mobile Code Security", Mobile code security, Nov./Dec. 1998, IEEE Internet Computing, pp. 30-33.

Sean Finnegan, "Managing Mobile Code With Microsoft Technologies", Aug. 31, 2000, www.microsoft.com/technet/security/mblcode.asp, pp. 1-16.

* cited by examiner

MOBILE CODE SECURITY ARCHITECTURE IN AN APPLICATION SERVICE PROVIDER ENVIRONMENT

FIELD OF INVENTION

The present invention relates generally to computer networking software. More particularly, it relates to a software protocol for providing applications comprising mobile code in an application service provider environment.

BACKGROUND

As used herein, the term "mobile code" refers to any portable executable instructions that can be downloaded and run on a computer system without modification or recompilation in a platform-independent fashion. Mobile code, especially Java mobile code, has gained widespread use in the areas of electronic commerce and services and will likely extend to many applications provided in future application service provider (ASP) environments.

Since the emergence of Java and related mobile code technologies, mobile code security has been a popular area for offerings of commercial solutions and active academic research. The use of mobile code presents a new challenge to the security systems in traditional platforms. Unlike shrink-wrapped, off-the-shelf application code, downloadable mobile code is inherently untrustworthy. Therefore, existing mobile code security solutions have focused on establishment of the trust between the application provider and the application user. A mobile code security solution is commonly considered sufficient if it can support the same level of trust between users and downloaded mobile code as its shrink-wrapped counterpart. All existing solutions share a common goal of protecting the principal's security domain from being compromised by untrustworthy downloaded code. As a result, existing systems use a set of security platforms designed for safe mobile code execution and run-time access control. Although these platforms work well in a traditional client-server system, they are not flexible enough in an application service provider (ASP) environment.

The rising trend of application outsourcing to ASPs disrupts the accepted application-usage model. Instead of owning the application after acquiring it from application providers, users outsource the runtime management and sometimes even the ownership of an application to an ASP. The user and the ASP are connected via a network, such as a global computer network like the Internet. In this new model, two different entities take on the roles of the runtime platform owner and the application user. This more complex environment complicates the mobile code security problem.

Existing systems use at least three common approaches to mobile code security: the sandbox approach, the code-signing approach, and the firewall approach. A fourth technique referred to as "proof-carrying code" is also used, though it is less-common. In the sandbox model, mobile code is given a run-time environment with a very limited set of system operations. The limited set of operations prevents mobile code from compromising the underlying platform, but it also limits the functionality of the mobile code. The firewall approach involves setting up a "mobile code firewall" device at the border of a security domain (e.g. the network boundary of an organization) to inspect mobile code.

The code-signing approach attempts to provide assurance about the source of the mobile code so it can be trusted. Microsoft Authenticode is an example of the code-signing technique. Mobile code is distributed in so-called Cabinet (.CAB) files. A typical Cabinet file contains the compressed mobile code and the signature of the mobile code generated using the application provider's private key. Before allowing the downloaded mobile code to run, users of the application examine the signature to ensure that (1) the code is properly signed by some application provider trusted by the user, and (2) the code has not be altered in transmission. In essence, signatures on mobile code work as the "digital shrink-wrap." Code-signing is limiting in that it gives the application user only a binary choice of either completely trusting the code with the signature or denying its execution. There is no run-time access control support in a code-signing system.

The original Java security system is essentially a sandbox system. Downloaded Java applets are prevented access to many local system resources such as the file system and most of the network. Advances in Java security results in a hybrid system that combines the code-signing and sandbox approaches to create a run-time access control environment in which access-control decisions are made dynamically based on the signature of the code.

Security policies controlling access privileges to grant to particular mobile codes are stored in a local policy file editable only by the platform owner. Despite the additional flexibility, this hybrid approach is still limiting. First, run-time access control decisions are still based on who signs the code, not what the code will do. Second, a user of the application is assumed to be also the owner of, or at least in the same administration domain as, the run-time platform, which is not necessarily the case in the ASP environment. Lastly, mobile code instances are implicitly granted all the privileges permitted by the security policy regardless whether they are needed for the task in question, which is against the least privilege principle (LPP) of good security system practice. What is needed is a better system for managing mobile code in an ASP environment.

SUMMARY OF INVENTION

A method is disclosed for providing mobile code software applications to users via an application service provider (ASP). The ASP receives a mobile code application, such as a Java application, from a provider, along with a security specification. The security specification defines access privileges requested to execute the application, including privileges to execute functions performed by the application and privileges to access local resources of the ASP. The ASP receives a subscription to the application from a user. The subscription includes subscription information granting or denying privileges, and specifying parameters for the privileges, requested in the security specification. The ASP executes the application at runtime by determining for each executable function whether the user has authorized the requested privilege. Those functions authorized by the user are executed in one embodiment. During runtime the ASP limits the application's access to local resources based on the privileges granted by the user.

An application service provider is also disclosed having a runtime environment for executing a mobile code application, an application store for storing an application received from a provider, and a subscription database for storing information related to access privileges for the program specified by the user. The ASP also stores a security specification received from the provider with the application. The specification requests privileges for the application, such as privileges to execute certain functions and privileges to use local resources. The user "owns" the local resources, which are managed by and outsourced to the ASP. The user grants or denies access to its resources by specific applications, or portions of applications, through the subscription process. As used herein, "subscription information" refers to any information that specifies parameters for the execution of a mobile code application. By way of example, the subscription information includes parameters controlling the execution of specified functions of an application and parameters controlling access by the application to local resources. At runtime, the ASP retrieves the subscription information from the subscription database and determines whether the application or modules of the application can execute based on granted privileges. While the application is running, the ASP controls access to local resources based also on the subscription information.

A computer system is also disclosed having an ASP, a provider that provides a mobile code application to the ASP, and a user. The provider sends an application and a security specification to the ASP for storage in an application store. The user subscribes to the application by sending subscription information to the ASP specifying privileges for the application. The ASP may prompt the user for subscription information. The ASP runs the application in a controlled environment based on the subscription information. At runtime, if an application needs a privilege not granted during the subscription, the ASP may prompt the user for the additional privilege.

DETAILED DESCRIPTION

Figure 1:
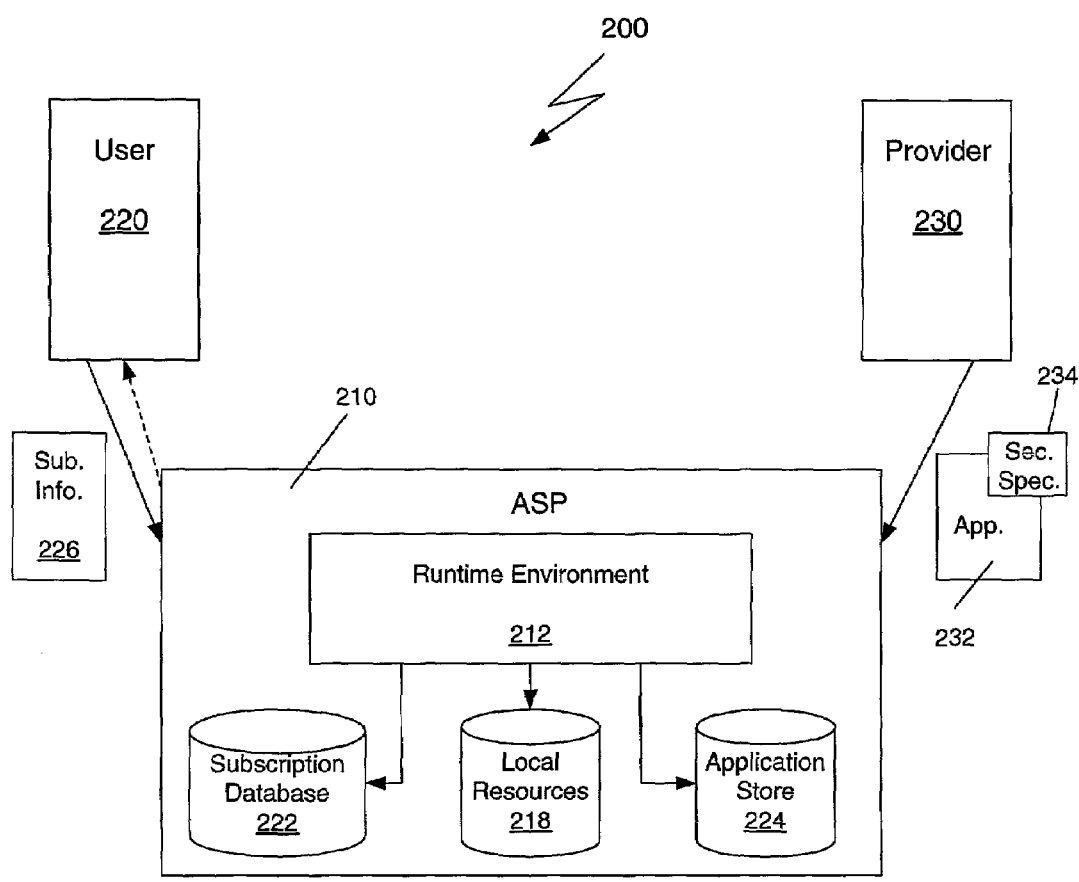
FIG. 1 shows a block diagram of the system.
Figure 2:
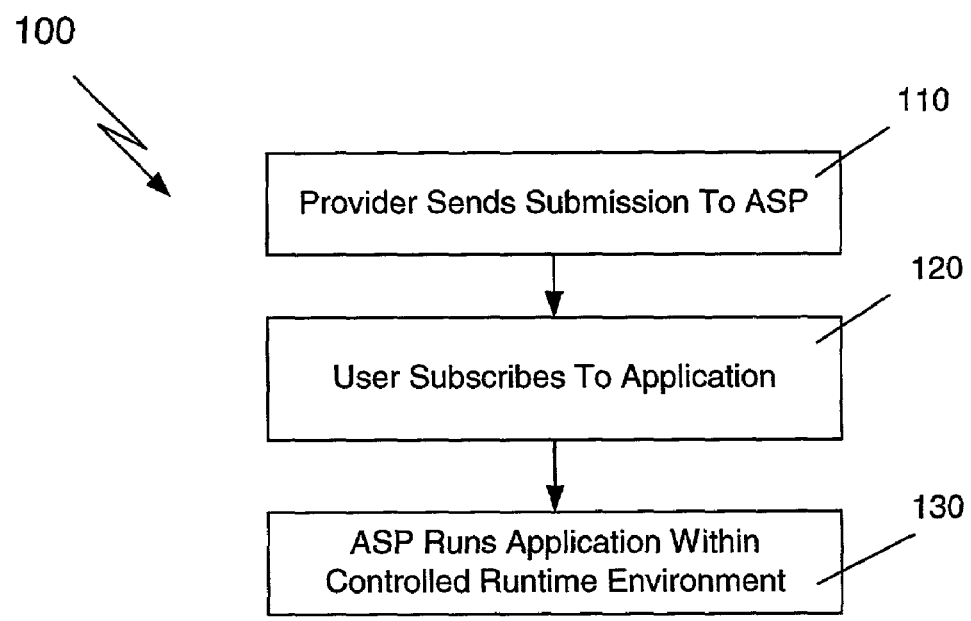
FIG. 2 shows a flow chart of the method used by the system.

FIG. 1 shows a block diagram of a system 200 for using mobile code in which three principals are involved: an application user 220, an application provider 230, and an application service provider (ASP) 210. FIG. 2 shows a flow chart of the method 100 of using a mobile code application 232 via the ASP 210. The method 100 is illustrated with reference to the system 200 shown in FIG. 1. The application provider 230 makes a mobile code application 232 available 110 to the application user 220 via the ASP 210. The application provider 230 sends 110 the application 232 to the ASP 210 during a submission process 110. The application 232 is sent along with a security specification 234. The provider 230 sends the application 232 and the security specification 234 over a network such as the Internet using conventional protocols. After the application 232 is received by the ASP 210, it may be stored in an application store 224.

The user 220 may access the application 232 by subscribing 120 to it, through the ASP 210. The user 220 represents, for example, a user at a computer or other processor-based device accessing the ASP 210 over a network such as the Internet. During the subscription process 120, the user 220 gives the application 232 privileges as desired by the user 220. The privileges may enable the application 232 to perform certain functions, for example, to read or write data from or to a file. The privileges may also allow the application 232 to access local resources 218 that are hosted by the ASP 210 but "owned" by the user 220. The privileges are stored as subscription information 226 by the ASP 210 in the subscription database 222. As used herein, an "application store" 224 and a "subscription database" 222 include any one or more data structures capable of storing code or other information. At run-time, the application 232 is executed 130 by the ASP 210, within a controlled runtime environment 212 that runs the application 232 according to privileges granted in the subscription process 120. The execution 130 is performed for the user 220 as indicated by the dashed arrow.

During the submission process 110, the application provider 230 submits 110 an application 232 to the ASP 210 where it is made available to the user 220. The provider 230 submits 110 the executable code 232 and a security specification 234 about the application code 232. In one embodiment, the code 232 is a machine-specific binary or byte code used with the Java language. In one embodiment, the security specification 234 may be provided as an extension of the Interface Definition Language (IDL) of a the application 232. Alternatively, the specification 234 may be a separate file, which may be sent along with the application 232 or separately.

By way of example, the application 232 might be an electronic mail (email) application 232 having various optional implementations, sometimes referred to as a flexible-usage model. Some of these implementations might be available for free, while others may require payment from the user 220. The provider 230 submits 110 the application 232 to the ASP 210 that hosts the application 232. The user 220 subscribes 120 to the application 232 by granting specified privileges to the application 232. For example, the email program might request to store email messages to files stored at the ASP 210. To subscribe to the email application, the user 220 might be required to grant the application privileges to create the email files.

The email application might have optional features, some of which might require payment. In one embodiment, if the user 220 does not grant privileges requested for these optional features, the base application executes, notwithstanding the denial of the privileges. In one example, the user 220 subscribes to a fee-based feature, such as design stationery or sorting functions for email messages. In this example, the application 232 might require the user 220 to grant, during the subscription process 120, privileges for the application to charge the user 220 a specified amount of money, for example, by accessing the user's credit card number stored in a "digital wallet" at the ASP 210. In one example, the application 232 may request privileges to automatically charge a user 220 up to a specified limit without requesting additional payment.

Another example use of the system 200 and method 100 might be in conjunction with a language translation application, such as an application that may be part of, or used in conjunction with, an email application or word processing application. The application may include the ability to translate text to a variety of different foreign languages, but for any given implementation, the user 220 may only require translation to a single language, for example English to Spanish. During the subscription process 120, the user 220 might grant the application privileges to perform only those functions, and to access only those resources 218, needed for the English-to-Spanish translation. If a prompt is used 122 by the ASP 210 to retrieve subscription information, it might simply include a screen having a number of language-translation options that the user 220 can select, along with a "subscribe" button or icon, selection of which causes the subscription information to be sent 120 to the ASP 210. Optionally, the prompt may include payment information, if the application or features of the application require payment of a fee.

Figure 3:
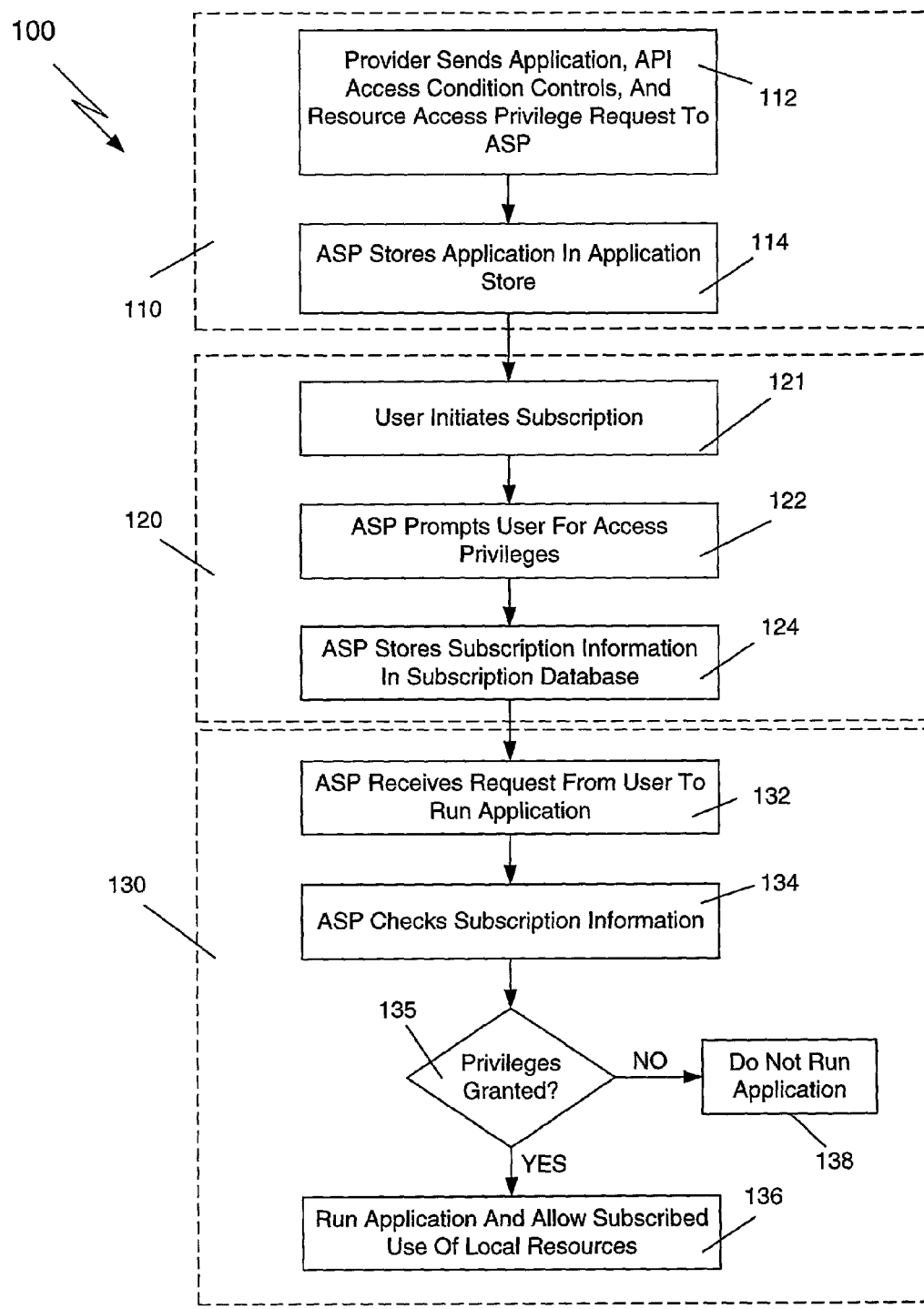
FIG. 3 shows a more detailed flow chart of the method shown in FIG. 2.

FIG. 3 shows a more detailed flow chart of the method 100 used by the system 200 to process mobile code. During the submission process 110, the provider 230 sends 112 the application 232 along with a security specification 234 to the ASP 210. Applications 232 may be submitted 110 to the ASP 210 and the ASP 210 may offer the applications 232 to users 220, for example by advertising them for sale or license. In one embodiment, the security specification 234 may contain application program interface (API) access conditions and a resource access privilege request. As used herein, an API access condition refers to any condition that controls invocation of a function of the application 232. With this information, an ASP 210 can support flexible usage models such as per-usage billing, described herein. In one embodiment, the provider 230 and the ASP 210 may have an agreement off-line regarding the use and enforcement of API access conditions.

The resource access privilege request is any request that specifies the type of local resource 218 access that is needed for the application 232 to complete certain tasks. At runtime 130, the application 232 may request access to certain local resources 218. The user 220 "owns" the local resources 218, which are managed and outsourced by the ASP 210. For example, an application 232 may request write access to a temporary directory. Another example may be an e-commerce application that requests access to certain sensitive customer data, such as the customer's digital wallet, in order to pay for a transaction. The ASP 210 receives from the provider 230 the types of access to local resources 218 that the application 232 will require so that the user 220 can decide whether or not to grant this requested access during the subscription process 120 described herein. Upon the completion of a successful application submission 110, the ASP 210 stores 114 both the application executable code 232 and its security specification 234 in the application store 224.

An application user 220 initiates the subscription process 120, for example, by initiating 121 a subscription request. The ASP 210 may prompt 122 the user 220 to review the functions offered by an application 232, and its security specification 234. In one embodiment, in order for a subscription 120 to be successful, a user 220 must agree to both accept the condition stated in the API access condition and grant the access privileges appropriate for the tasks. The ASP 220 stores 124 the subscription information 226 obtained from the user 220, including the privileges, in the subscription database 222. In one flexible-usage embodiment, the user 210 may subscribe not only to entire applications 232, but also to specific modules of applications 232, and may grant limited privileges to the application 232. This allows the application 232, or portions of the application 232, to run even though complete permission has not been granted.

By way of illustration, in the example of the email language translation application, each language conversion may be a separate module that can be optionally implemented. For example, the translation application may receive a text stream as input and generate a text stream as output in another language. It may use three functions:

void englishToSpanish(InputStream in, OutputStream out)

void englishToChinese(InputStream in, OutputStream out)

void englishToFrench(InputStream in, OutputStream out)

The security specification 234 can be in an extensible markup language (XML) format such as the following:

```
<program name="translator">
...
    <function name="englishToSpanish">
        <resource-required action="r">
            $mail-message
        </resource-required>
        <resource-required action="rw">
            $mail-box
        </resource-required>
        <resource-required action="charge"
                            param="$0.1"
                            when="execute">
            $wallet
        </resource-required>
    </function>
...
</program>
```

This security specification 234 says is that the englishToSpanish function requires read access to the specific mail, read-write access to the mail box (write to store the output), and a "charge" access to the electronic wallet with a "$0.1" charge every time the function is executed. A similar specification might omit the wallet charge requirement for one function, such as englishToChinese, may have a $0.05 charge for the function englishToFrench be "$0.05"

The subscription information may be stored or transferred in various suitable forms, such as tables, files, or other data structures. In one example, the subscription information may be embodied in XML code. In another example, the subscription information may use an interface definition language (IDL) or a binary table. An example subscription of a user 220 for the example email translation application described above might be as follows:

```
<subscription name="translator-subscription">
    <program-name>translator</program-name>
    <grant>
        <resource name="$mail-message" action="r" />
        <resource name="$mail-box" action="r" />
        <resource name="$wallet" action="charge"
                                  limit="$0.06"
                                  when="execute" />
    </grant>
</subscription>
```

In this example, the subscription has placed a limit on the wallet of $0.06. The effect of this subscription is that when the user 220 activates the translation process, only two functions are enabled: englishToChinese and englishToFrench. The function englishToSpanish is too expensive for the example subscription.

An application runtime 130 can be triggered by a registered system event or manually 132 by a subscribed user 220, as shown in FIG. 3. The runtime environment 212 enforces the subscription policies. At runtime 130, the runtime ASP 210 checks 134 the subscription information 226 in the subscription database 222. Using this information 226, the ASP 210 determines 135 whether the application 232 satisfies the parameters or other relevant information within the user's subscription. In one embodiment, the runtime environment 212 does not load 138 any application module to which the user 220 has not subscribed. In one embodiment, the ASP 210 requests from the user 220 at runtime 130 any additional privileges needed to run the application 232 or the application modules. If the user 220 has subscribed 120 to the application 232, then the application 232 is run 136 within the runtime environment 212 and is controlled by the ASP 210. In particular, the ASP 210 controls access by the application 232 to local resources 218. The application 232 is given no greater access to local resources 218 than the subscription allows.

The submission 110 and subscription 120 processes combined form a "usage contract" between the application user 220 and provider 230. As a trusted intermediary of this contract, the ASP 210 provides not only a execution environment but also the runtime policy enforcement platform. One skilled in the art will recognize that the method 100 and system 200 may be implemented using various types of mobile codes.

Figure 4:
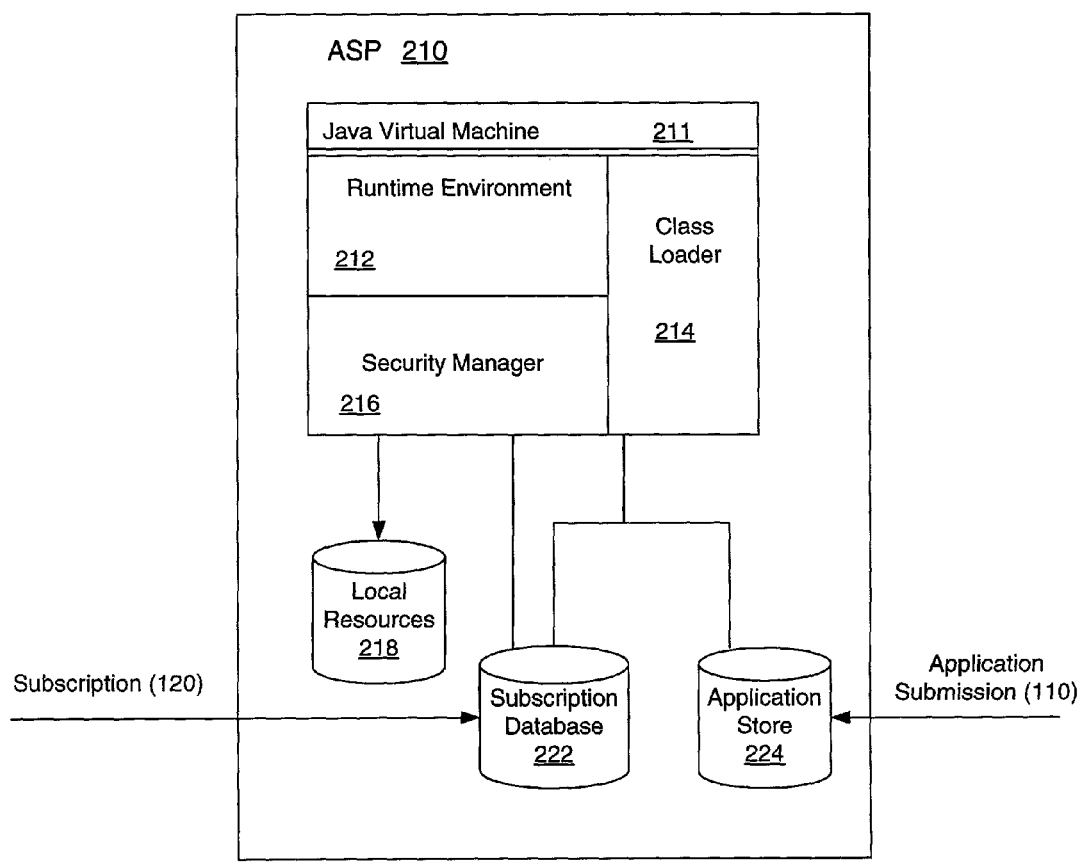
FIG. 4 shows a block diagram of one implementation of the system.

FIG. 4 shows a block diagram of one implementation of the architecture using a Java language. In this embodiment, the method 100 and system 200 are implemented using a Java language and, in particular, the highly modular Java version 2 security architecture. The architecture may be implemented in Java by replacing or extending the class loader 214 and security manager 216 modules. The ASP 210 has a Java Virtual Machine (JVM) 211. The runtime environment 212 is a part of the JVM 211, as well as class loader and security manager modules 214, 216. The class loader 214 accesses the subscription database 222 to determine whether the user 220 has a subscription 120 to an application 232. If the user 220 is subscribed 120, then the class loader 214 is responsible for loading a particular Java class at runtime 130. For example, when the program 232 wants to create an object of type MyObject.PaymentObject for the first time in its execution, a class loader 214 is called to search the classpath for the bytecode definition of that class and to load that into the memory. To implement the subscription-based usage policy, the class loader 214 performs an extra function. After finding the class definition, the class loader 214 checks the subscription database 222 to determine if usage of the class is allowed. In other words, in the example shown the effective subscription at the time of class loading must meet the API access condition specified by the application security specification 234.

As a class loader 214 controls loading of bytecode, a security manager 216 is responsible for enforcing runtime security policies on Java object instances. In the example of Java 2 described with respect to FIG. 4, a so-called "Policy Based, Permission Driven" security model is used. A Java permission is a statement about what object can perform what action on what resource 218, and the policy is a collection of permissions. In the conventional Java 2 implementation, an object is associated with the identity of its creator who, in most cases, is the developer of the Java class. Furthermore, the conventional security manager 216 in Java 2 only recognizes a few well-defined operations on well-known resource types, such as files and sockets. The system 200 uses a custom security manager 216 to implement the subscription-based policy in this example. The security manager 216 controls runtime access to local resources 218 in a manner similar to the way in which the class loader 214 controls class loading. Because the conventional class loader 214 and the security manager 216 are customizable by design, the implementation in this architecture is backward-compatible with all Java 2-compliant applications.

Figure 5:
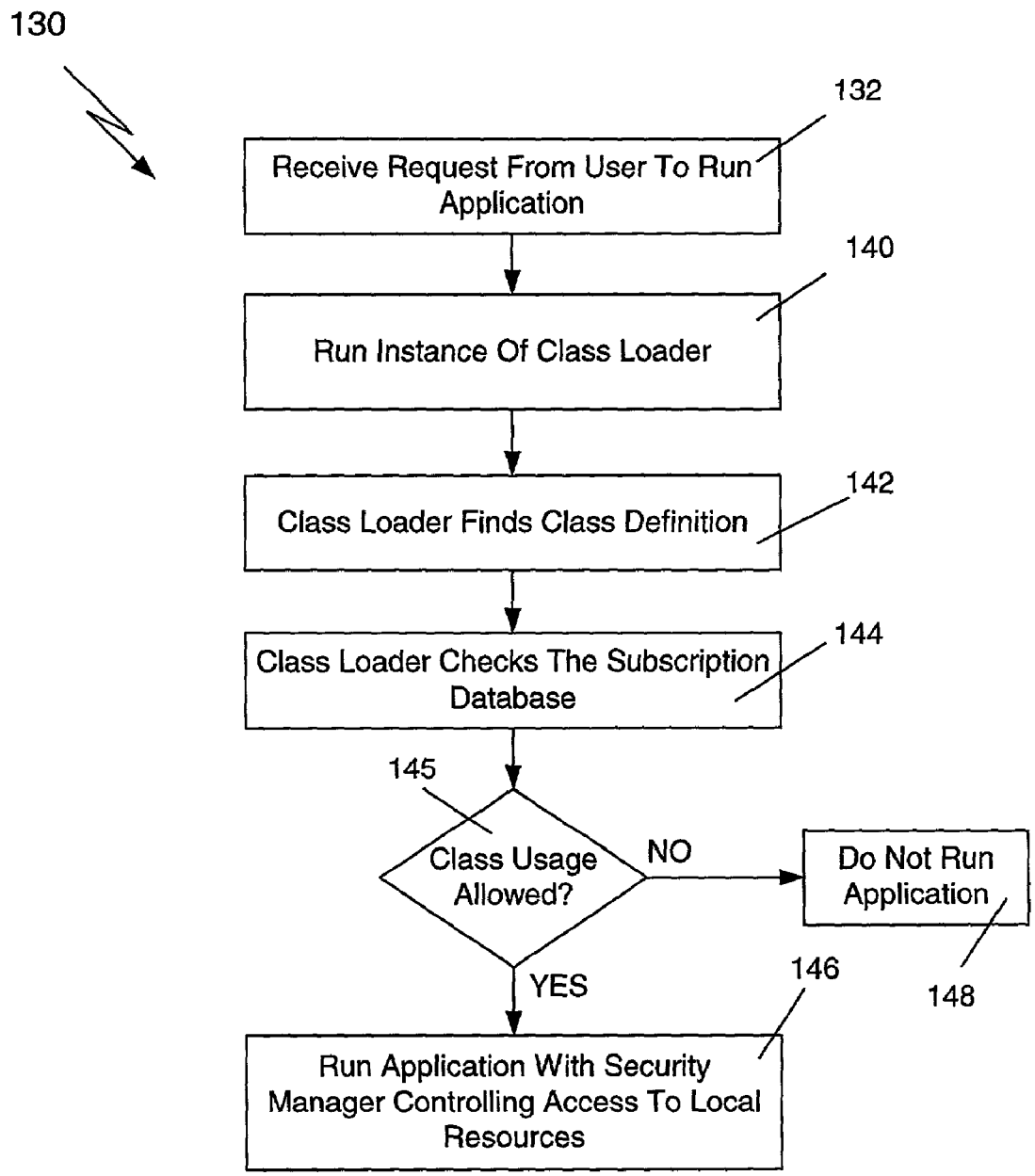
FIG. 5 shows a flow chart of one implementation of the runtime process on the system shown in FIG. 4.

FIG. 5 shows a flow chart of the runtime method 130 of the ASP 210 as implemented by the exemplary Java 2 system described with respect to FIG. 4. In the example of FIG. 5, the ASP 210 receives 132 a request from a user 220 to run an application 232. The ASP 210 runs 140 an instance of the class loader 214. The class loader 214 finds 142 a class definition from the subscription database 222. Using this class definition, the ASP 210 checks 144 the subscription database 222 and determines 145 whether the user 220 has given permission to use the requested class. If the user 220 has not given permission, then the application or application module is not run 148. If the user 220 has given permission, then the application 232 is run 146 according to the parameters of the user's subscription, and the security manager 216 controls access by the application 232 to local resources 218.

Although the present invention has been described with respect to particular embodiments thereof, variations are possible. The present invention may be embodied in specific forms without departing from the essential spirit or attributes thereof. In particular, although certain aspects of the invention were described with respect to a Java programming language, one skilled in the art will recognize that the method and system may be implemented using any mobile code including, for example, Microsoft mobile code. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). It is desired that the embodiments described herein be considered in all respects illustrative and not restrictive and that reference be made to the appended claims and their equivalents for determining the scope of the invention.

What is claimed is:

1. A method for processing a mobile code application by a host application service provider (ASP) to an end user, and for enforcing access controls based on the user's subscription to local resources that the ASP manages on the user's behalf, the method comprising:

receiving at a host ASP a mobile code application from a provider, the provider being a separate entity from the host ASP, the application including a plurality of functional modules and being immediately available to users upon receipt from the provider;

receiving at the host ASP a security specification that is generated by the provider and associated with the application, the security specification describing application program interface (API) access conditions and resource access privilege requests;

receiving at the host ASP subscription information associated with a user;

forming a usage contract between the user and the provider, the user and the provider both being customers of the host ASP;

the host ASP dynamically granting, at runtime, limited access to resources managed by the host ASP but owned by the user according to the subscription information associated with the user, wherein the user can subscribe to specific functional modules of the application as opposed to an entire application; and executing the application within a runtime environment of the host ASP using the subscription information on behalf of the user without the user's intervention.

2. The method of claim 1, wherein the step of receiving subscription information comprises receiving information related to access privileges requested by the application as part of the security specification.

3. The method of claim 1, wherein the step of receiving the application comprises receiving a mobile code application that supports a flexible-usage implementation in which features of the application are optionally enabled based on the subscription information by a specific end user during a subscription process without executing the application.

4. The method of claim 3, wherein the step of granting comprises enabling a user to review the security specification of the application and to selectively enable certain functionalities, and wherein the step of executing comprises executing the selected functionalities of the application based on the subscription information.

5. The method of claim 1, further comprising:
storing the application and the security specification in an application store of the ASP; and
storing the subscription information in a subscription database of the ASP.

6. The method of claim 1, wherein the step of executing comprises limiting access by the application at a level of granularity of an individual API to local resources of the ASP based on the subscription information.

7. The method of claim 1, further comprising requesting from the user additional privileges at runtime if the application requires a privilege that has not been granted.

8. The method of claim 1, wherein the step of executing comprises:
running an instance of a class loader;
determining from the subscription information whether a class can be used by the application;
executing the application based on the determining; and
controlling access to a local resource of the ASP on a per-API basis using a security manager.

9. A host application service provider (ASP) for making functionalities of a mobile code application received from a provider available to a user without any execution of the application at a subscription time, and for executing the application on behalf of the user, the host ASP comprising:
an application store that stores a mobile code application and an associated security specification received from a provider, the provider being a separate entity from the host ASP, the security specification describing application program interface (API) access conditions and resource access privilege requests, and the application being immediately available to users upon receipt from the provider;
a subscription database that receives subscription information for a user, the user and the provider both being customers of the host ASP, the subscription information comprising:
information related to a function of the application; and
information related to access by the application on a per-API basis to a local resource of the ASP that is owned by the user granting the subscription,
wherein the subscription information makes functionalities of the application available to the user without any execution of the application at a subscription time;
a local resource store that stores local resources managed by the host ASP on behalf of the user, wherein the host ASP dynamically grants, at runtime, limited access to the local resource according to the subscription information associated with the user, wherein the user can subscribe to specific functional modules of the application as opposed to an entire application; and
a runtime environment that executes the application based on the subscription information on behalf of the user without the user's intervention.

10. The ASP of claim 9, wherein the subscription information is related to the security specification.

11. The ASP of claim 9, wherein the application includes Java code, and wherein the ASP further comprises class loader that checks the subscription information in the subscription database at runtime to determine whether use of a class requested by the application is permitted by the user.

12. The ASP of claim 11, wherein the ASP further comprises a security manager that controls access of by the application to a local resource during runtime.

13. The ASP of claim 9, wherein the mobile code application supports a flexible-usage implementation in which features of the application can be optionally enabled based on the subscription information by a specific end user at the subscription time without executing the application.

14. The ASP of claim 9, wherein the runtime environment limits access by the application to local resources and execution of the application based on the subscription information.

15. A system for enforcing access controls based on the user's subscription to local resources that a host application service provider (ASP) manages on the user's behalf, comprising:
a host ASP having a runtime environment for a mobile code application, the application including a plurality of functional modules and being immediately available to users upon receipt from the provider;
an application provider that provides the application and an associated security specification to the host ASP, the application provider being a separate entity from the host ASP, the security specification describing application program interface (API) access conditions and resource access privilege requests; and
an application user device that accesses the host ASP and subscribes to the application using subscription information, wherein the host ASP forms a usage contract between the user and the application provider, and dynamically grants, at runtime, limited access to resources managed by the host ASP but owned by the user according to the subscription information associated with the user, wherein the user can subscribe to specific functional modules of the application as opposed to an entire application, wherein the user and the application provider are both customers of the host ASP,
wherein the host ASP controls execution of the application using the subscription information on behalf of the user without the user's intervention.

16. The system of claim 15, wherein the ASP requests the subscription information from the user, and the user sends the subscription information to the ASP.

17. The system of claim 15, wherein the ASP further comprises:
a subscription database that stores the subscription information; and
an application store that stores the application.

* * * * *